United States Patent
Mahamuni et al.

(10) Patent No.: US 12,106,273 B2
(45) Date of Patent: Oct. 1, 2024

(54) SECURE AND CONTACTLESS DEBIT TRANSACTIONS

(71) Applicant: KYNDRYL, INC., New York, NY (US)

(72) Inventors: Amol Bhaskar Mahamuni, Bangalore (IN); Debasisha Padhi, Bangalore (IN); Nidhi Patel, Bangalore (IN)

(73) Assignee: Kyndryl, Inc., New York, NY (US)

( * ) Notice: Subject to any disclaimer, the term of this patent is extended or adjusted under 35 U.S.C. 154(b) by 2 days.

(21) Appl. No.: 17/970,796

(22) Filed: Oct. 21, 2022

(65) Prior Publication Data

US 2024/0135348 A1  Apr. 25, 2024
US 2024/0232839 A9  Jul. 11, 2024

(51) Int. Cl.

| | |
|---|---|
| *G06Q 20/10* | (2012.01) |
| *G06Q 20/32* | (2012.01) |
| *G06Q 20/38* | (2012.01) |
| *G06Q 20/40* | (2012.01) |
| *G06V 40/16* | (2022.01) |
| *G10L 15/18* | (2013.01) |

(52) U.S. Cl.
CPC ..... *G06Q 20/1085* (2013.01); *G06Q 20/3223* (2013.01); *G06Q 20/3272* (2013.01); *G06Q 20/389* (2013.01); *G06Q 20/40145* (2013.01); *G06V 40/176* (2022.01); *G10L 15/1807* (2013.01)

(58) Field of Classification Search
None
See application file for complete search history.

(56) References Cited

U.S. PATENT DOCUMENTS

| | | | |
|---|---|---|---|
| 7,328,844 B2 * | 2/2008 | Workens | G07F 19/20 |
| | | | 235/487 |
| 7,995,802 B2 | 8/2011 | Hu et al. | |
| 8,543,506 B2 * | 9/2013 | Grandcolas | G06Q 40/00 |
| | | | 705/42 |

(Continued)

FOREIGN PATENT DOCUMENTS

| | | | |
|---|---|---|---|
| IN | 201721040860 A | * | 12/2017 |
| WO | 2019032587 A1 | | 2/2019 |

(Continued)

*Primary Examiner* — Paul S Schwarzenberg
(74) *Attorney, Agent, or Firm* — CANTOR COLBURN LLP; Erik Swanson

(57) ABSTRACT

A method is provided that includes configuring a cellular phone to function as a mobile debit card by installing an application for contactless interfacing with ATMs. The method supplements the application with a neural network (NN) based biometric verification process configured to reduce an incorrect user error value over time to increasingly harden the application to undesired intrusion. The NN based biometric verification process comprises: performing an initial face recognition; greeting the user with one of a plurality of questions in a specific language of the user and evaluating a pre-defined answer provided from the user in the specific language; and detecting, in an acoustic utterance having dialogue in support of an ATM session, a voice and a prosody style indicative of the user in combination with lip and face movements made by the user corresponding to and in synchronization with the acoustic utterance.

20 Claims, 6 Drawing Sheets

(56) References Cited

U.S. PATENT DOCUMENTS

| | | | |
|---|---|---|---|
| 9,886,688 B2 | 2/2018 | Weiner et al. | |
| 10,412,096 B2 * | 9/2019 | Wagner | G06Q 20/4014 |
| 10,559,312 B2 * | 2/2020 | Aronowitz | G10L 25/57 |
| 10,592,718 B2 | 3/2020 | Khuri-Yakub et al. | |
| 10,691,912 B2 | 6/2020 | Khuri-Yakub et al. | |
| 10,776,471 B2 | 9/2020 | Tussy | |
| 10,984,419 B2 | 4/2021 | Ruparelia et al. | |
| 11,023,704 B2 | 6/2021 | Khuri-Yakub et al. | |
| 11,100,205 B2 * | 8/2021 | Burri | G06V 40/166 |
| 11,157,909 B2 | 10/2021 | Giobbi | |
| 11,182,785 B2 | 11/2021 | Newman et al. | |
| 11,257,067 B1 | 2/2022 | Yang et al. | |
| 11,645,862 B2 | 5/2023 | Khuri-Yakub et al. | |
| 12,033,423 B2 | 7/2024 | Khuri-Yakub et al. | |
| 2021/0027295 A1 * | 1/2021 | Raquepaw | G07F 19/206 |

FOREIGN PATENT DOCUMENTS

| | | |
|---|---|---|
| WO | 2019032590 A1 | 2/2019 |
| WO | WO2022013885 A | 1/2022 |

\* cited by examiner

SECURE AND CONTACTLESS DEBIT TRANSACTIONS

BACKGROUND

The present invention generally relates to financial transactions, and more particularly to secure and contactless debit transactions.

The use of ATMs has gone up significantly over the last ten years, not only in terms of their adoption, but also by the variety of banking functionality that are being offered to a user through the ATM. The current ATM technology utilizes a customized card with an embedded microchip on which the user's information is stored. The user swipes his card in the ATM machine and is asked to enter a unique PIN number to authenticate himself as a valid account holder with the bank. The in-built application in the ATM authenticates the user over the bank's network and allows the user to perform a pre-defined set of transactions.

There can be fraud when a user hands over the card for bill payment, and when the customer is out of sight before receiving the receipt, the intermittent time can be used for hacking or duplicating the card or if the card could be stolen. It becomes a little cumbersome for a user to carry several cards and remember the Personal Identification Number (PIN) for each of them.

The pin can be accessed without the user's knowledge and a transaction can be executed. The PIN can be traced in several ways, such as by tracking the user's keystrokes. Most of the ATM transactions are card and PIN dependent and require only one level of verification. Once the card is lost or broken, the transactions on ATM cannot be performed. If the PIN is forgotten, the user has to request the bank to regenerate the new PIN. Until then, the user cannot use the TM to perform any financial transactions.

Several lenders have started the facility of card-less transactions enabling customers to transfer cash from their bank accounts to any individual with a mobile number. However, existing transaction methods do not provide a fool-proof secure transaction mechanism.

SUMMARY

According to aspects of the present invention, a method is provided. The method includes configuring a cellular smart phone to function as a mobile debit card by installing in the cellular smart phone an application for contactless interfacing with Automated Teller Machines (ATMs). The method also includes supplementing the application with a neural network (NN) based biometric verification process configured to reduce an incorrect user error value over time to increasingly harden the application to undesired intrusion. The NN based biometric verification process comprises: performing an initial face recognition of a given user of an Automatic Teller Machine (ATM) session; greeting the given user with one of a plurality of questions in a specific language of the given user and evaluating a pre-defined answer provided from the given user in the specific language; and detecting, in an acoustic utterance having dialogue in support of the ATM session, a voice and a prosody style indicative of the given user in combination with lip and face movements made by the given user corresponding to and in synchronization with the acoustic utterance. The ATM session is locked down responsive to an unsuccessful face recognition, an incorrect pre-defined answer, and any of non-matching prosody style and lip and face movements.

According to other aspects of the present invention, a contactless Automated Teller Machine (ATM) system is provided. The system includes a cellular smart phone configured to function as a mobile debit card having an application for contactless interfacing with Automated Teller Machines (ATMs). The application is supplemented with a neural network (NN) based biometric verification process configured to reduce an incorrect user error value over time to increasingly harden the ATM application to undesired intrusion. The NN based biometric verification process comprises a neural network (NN) based biometric verification process, supplementing the application, and configured to reduce an incorrect user error value over time to increasingly harden the application to undesired intrusion. The NN based biometric verification process comprises: performing an initial face recognition of a given user of an Automatic Teller Machine (ATM) session; greeting the given user with one of a plurality of questions in a specific language of the given user and evaluating a pre-defined answer provided from the given user in the specific language; and detecting, in an acoustic utterance having dialogue in support of the ATM session, a voice and a prosody style indicative of the given user in combination with lip and face movements made by the given user corresponding to and in synchronization with the acoustic utterance. The ATM session is locked down responsive to an unsuccessful face recognition, an incorrect pre-defined answer, and any of non-matching prosody style and lip and face movements.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to secure and contactless debit transactions.

Embodiments of the present invention provide secure and contactless debit transactions using a cellular smart phone having an ATM application stored thereon.

The ATM application involves a NN based biometric verification process. The NN based biometric verification process can involve, for example, but not limited to, face recognition, speech recognition, speaker recognition, lip movement recognition, facial movement recognition, prosody recognition, and so forth.

The ATM application further involves a NN based non-biometric verification process. The NN based non-biometric verification process can involve, for example, target item (e.g., jewelry) and a pre-approved appearance (e.g., clothing style) recognition.

Figure 1:
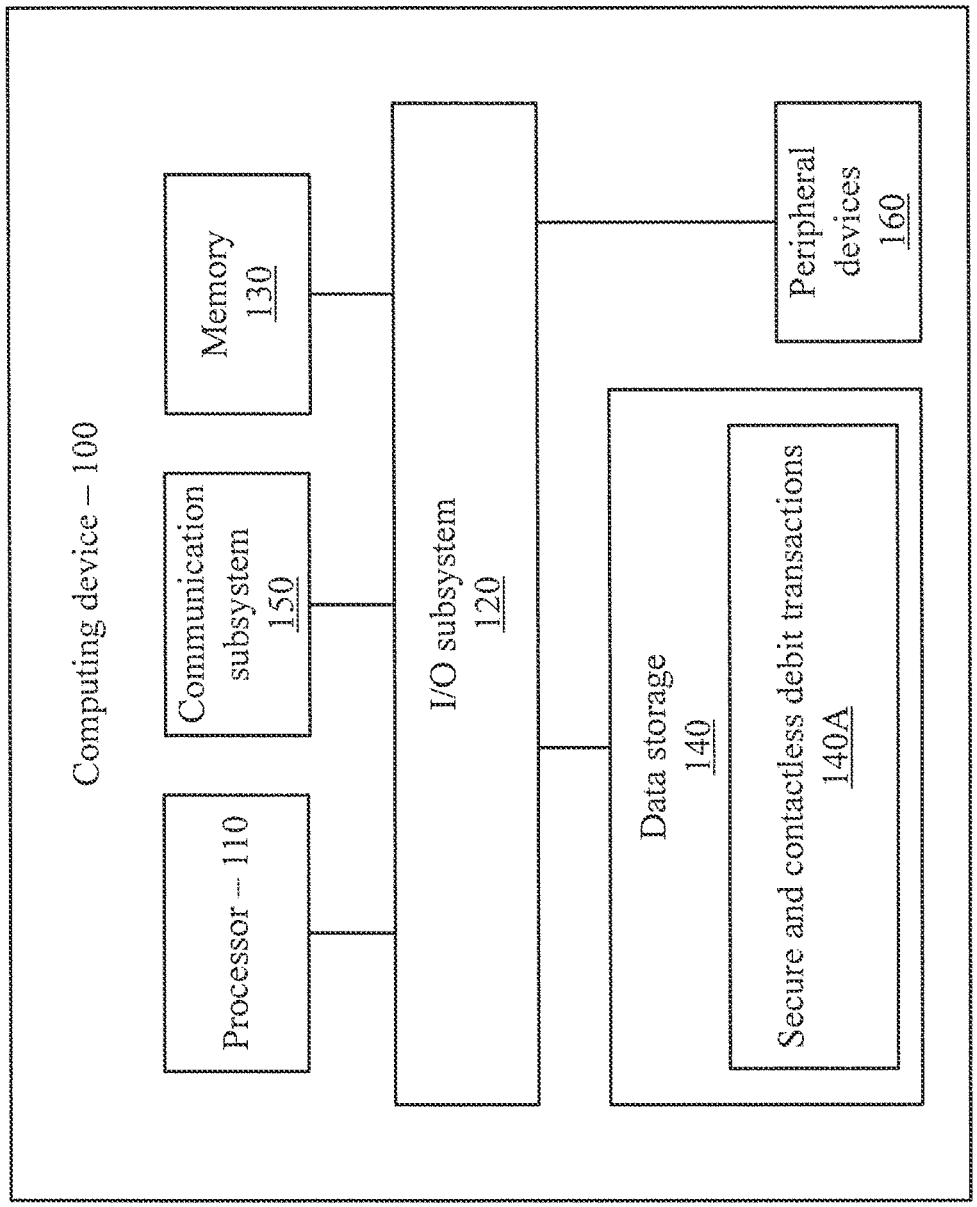
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform secure and contactless debit transactions. Computing device 100 can be any of elements 210, 220, and/or 230 as described with respect to FIG. 2.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for secure and contactless debit transactions. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention Embodiments of the present invention involve contactless ATM withdrawal without the need of a Debit Card as a users' phone can be a configured to function as a mobile device based Debit Card. Embodiments involving using a phone as Debit Card equivalent will not require touching to an ATM kiosk, making it more secure from duplicating the Debit Card and/or fingerprints, and so forth. Also this proposed method will have added security based on multiple pre-defined user preferences and the security will dynamically and in real time get more stronger based on the volume of transaction(s). This method will also be near fool proof as it would be backed by Artificial Intelligence (AI) to detect emotions, lip reading, dynamic face movement detection, language preferences and even personal choices such as color and patterns to add stronger security cover.

The proposed approach will need a new user to register himself/herself with the bank up front with pre-defined preferences such as multiple photos and videos in different (usually exercised) moods and attire, which are most commonly used by that user. For instance someone can prefer a Saree over Kurta for these photos and prefer Red color over green. User can also choose language of preference and also predefine a certain set of questions for which the user will be required to feed (a) right answer(s)—There can be more than one right answer (b) and also wrong answer. The idea of wrong answer here is that it can be a clue to send a SOS signal. These pre-defined settings can be changed any time through respective bank portal by registered users and the authentication to login to be to Bank portal is whatever normally prevalent such as 2FA etc.

The user will also download a phone based app on his/her phone device and this will also require certain phone device to be pre-registered with the bank. No random phone device can be allowed to do transactions on behalf of this user. It shall need pre-registration of certain phone device such as International Mobile Equipment Identity (IMEI) number.

When this user wants to withdraw any money, the user will start the debit transaction through the Bank App on authenticated phone device. The user shall enter all preferences of withdrawal of money such as amount to withdraw, choice of currency notes/bills and so forth on the phone app (and not in a kiosk terminal) and then reach a physical bank ATM kiosk.

After reaching the bank ATM kiosk, the user will scan the QR code of the certain kiosk and this is the time that the phone app and the certain said kiosk is now paired with each other for the first time. In place of QR code for pairing, we could also think about using any Near Field Communication (NFC) method such as a smart RFID reader, and so forth, but the fundamental premise here is basically touchless pairing.

The ATM kiosk is assumed to have audio and camera facility which normally most ATMs do have today. After scanning the QR code the first thing will be Multi-Person check, if more than one face is detected it will not proceed, once this check is passed the ATM will attempt face recognition of the user, based on the pre-defined face images pre-fed into the bank portal apriori.

The face recognition by itself can be proxy these days as a static photo can be shown to the camera and hence one or more embodiments of the present invention it is proposed that the ATM greet the user in the pre-defined preferred language which could be Marathi. The user is now expected to provide one of the three (or other number) pre-defined answers verbally for the transaction to proceed. This obviously would mean there will be lip movement and face movement. The ATM kiosk can now do AI based lip reading and face movement detection in addition to voice recognition, speech recognition, prosodic detection, emotion detection, and so forth to certify that the answer is correct and that the user himself/herself has spoken it (and not a pre-recorded voice). This adds levels of security to ATM transactions.

If the answer is one of the three expected answers, then the transaction can proceed. If the answer is garbled and unrecognized and/or ambiguous/unknown, then the transaction can either abort or can be given as a choice for the user to try another greeting/question. Whether to abort the transaction or let the user try another question depends on the volume of the withdrawal, as compared with the statistical mean of the "usual" withdrawal pattern of that user.

The background software in the bank would have determined by now what is the statistical withdrawal pattern based on the AI algorithms which will include many of the listed (but not limited) variants, such as:

the usual week of such withdrawal;
the usual city, state and country where there withdrawal normally happens;
the amount which is withdrawn in each transaction; and
the number of transactions per week or per month.

For an added layer of security the usual face signature sported by the user such as choice of jewelry, the nose ring normally worn, the necklace normally sported, the colors normally preferred, the pattern of the clothes normally worn and the type of attire (e.g., Saree) normally worn, and so forth.

In the previous step if the greeting question, in the native language, is not answered right and if the answer is unknown, the bank can abort the transaction or decide to provide another chance to user, based on the variance of the amount being withdrawn in this instance, versus the normal withdrawal pattern as described above. However if the answer is "known wrong" which is as fed at the time of registration as 'deliberate wrong' answer, then this will trigger a panic and the cops will get informed and the transaction will be aborted however the transaction abort voice message for the kiosk will be something simple such as "Insufficient balance".

The idea here is that this "known wrong" answer is a SOS signal from the user to let the police be informed that she/he is at gunpoint to withdraw cash. For instance, the question could be, where are you born and if the answer is Mumbai the transaction can move ahead, if the answer is Jaipur then it is just a simple wrong answer, but if the answer to this question is Chennai then there will be an SOS sent automatically and silently.

An added layer of security will involve a few more things such as the following.

Based on the variance between the amount being withdrawn versus the usual pattern, there will be more greeting/questions asked, again in the native language. And each time the user answers the questions, the video AI at the backend will certify the user based on voice recognition, speech recognition, prosodic detection, and so forth. The difference is speech recognition is used to recognize the words spoken, while voice recognition is used to recognize who's voice it is based on tone, pitch, prosodics, amplitude, and so forth.

Language recognition can be performed regarding the pre-defined language.

Face movement recognition and smile detection can be performed.

Lip movement matching can be performed with respect to the expected set of right answers.

And other variables such as the ones described earlier such as preferred color, preferred stripes, preferred ornaments, preferred choice of clothes (such as round neck T-Shirt like Steve Jobs), and so forth.

We also propose that all through the timeline of when the transaction began to when it would complete, there must be user's face, with natural face movements and emotions in front of the kiosk camera and that there needs to be just one face and not more than one at once. Also it means that the transaction will just abort the moment the face moves away from camera.

And based on the actual amount being withdrawn or based on the numbers of transaction in that month/week/day, more than one question/greeting can be asked to the user for an added layer of security.

As a matter of fact, if the user genuinely wants to withdraw larger sum, quite often this can be pre-planned, and hence the user can easily wear predesignated clothes, a predesignated color, and so forth which will appear less suspicious to the ATM's AI backbone.

Once all checks are passed user can authorize the amount through phone bio-metric and withdrawal will take place.

A description will now be given regarding some of the many attendant merits of the present invention, in accordance with an embodiment of the present invention.

This is complete contactless process and does not need a user to touch the ATM kiosk With the advent of 5G low latency communication, the kiosks at even remote areas can be easily connected with the bank's phone app on 5G communication, as needed. Note that the entire AI processing is done at the backend at the bank and the ATM kiosk is primarily a terminal for the same. This takes away the need to carry a debit card and even upgrade the debit card, and so forth.

There is no PIN to be entered at the ATM kiosk which is rather conventional and intrusion/threat prone.

Regular updates to the ATM banking does not actually need the ATM to be upgraded, and can involve upgrading the phone app instead. For instance for addition of current notes choice you only have to upgrade the phone app and not the ATM kiosk.

With less moving parts in ATM kiosk such as a card reader, a keypad, and so forth, ATM failures now can be reduced As the Kiosk is paired with the phone application, if there is any challenge such as kiosk being out of cash and so forth, the challenge can be easily notified to the bank through the phone application itself.

The cash replenishment at that certain kiosk and the preferred currency notes/bills at this kiosk can be easily maintained by the bank as each transaction is paired with the bank app. Bank's backend AI system can now easily determine how much of cash and in which currency to replenish at this kiosk and when to replenish.

The ATM can also have the ability to become a customer service application. Interactive services such as call or video systems can be incorporated to allow service agents to assist customers at a remote ATM. Banks can engage step-by-step with the customer to guide them through transactions or queries through video, audio, and on-screen annotations. This helps banks both retain the older customer demographic that values human interaction while also playing into the need to revolutionize the way complex, high value, services can be successfully delivered to the customer remotely and with less physical contact thus making it more hygienic All the heavy lifting and AI processing will be done at the backend, and for this a model already trained with thousands of images, voice samples, smile samples, language samples, and so forth can be used. The AI model training being compute intensive, and also needing lot of time-series data to be archived, this can be done from the backend at the bank's data center. In real time, there will be video and audio data which can be sent from ATM kiosk to the bank over, e.g., a 5G connection, if not hard wired.

As the training of models is more compute intensive these jobs for continuous training and improvement will be always run at the banks' data center in the background but for transactions to get through we only need trained model to be deployed which is much quicker and faster and hence will allow serving multiple such customers at once.

Within the AI models and model training there are the following aspects:

Choosing the right AI model and training the model with time-series data. Many classification techniques exist today such as logistic regression, Naïve bayes, KNN Support Vector machines and XGBoost, and so forth.

This can be supervised learning as we do have labelled data in this case and this will also improve the precision and F2 score of the AI system Continuous learning and active user feedback aka active learning to improve the accuracy. This will be done through the phone application providing feedback about each transaction when completed.

Image/voice correlation which can be achieved through CNN models such as HTM or LSTM but is not limited to these.

Anomaly detection can be quicker and faster in the backend and this can use neural models such as a feed-forward CNN especially suited for special data such as LeNet, ResNet, VGG, and so forth.

The ATM kiosk can use techniques such as DeepLens device which has its own Operating System (OS) running inside which has a better camera and which comes with multiple functions, where we can run basic correlation like multi-person detection check locally, and advanced checks can be done through multi-cloud services which can be invoked in real time such as AWS Recognition which provides highly trained models for various detection in real time.

With the advent of 5G and beyond, we can connect the DeepLens with the backend at a low latency. The backend can reside on the cloud as well. Since DeepLens has its own OS we can do some preprocessing locally and then send the prepossessed data to the backend for faster response.

We can roll out this model for limited customers (i.e., premium banking experience) and check the load on the backend and then we can make other optimizations as we find challenges and keep scaling and roll out for all customers as needed.

Figure 2:
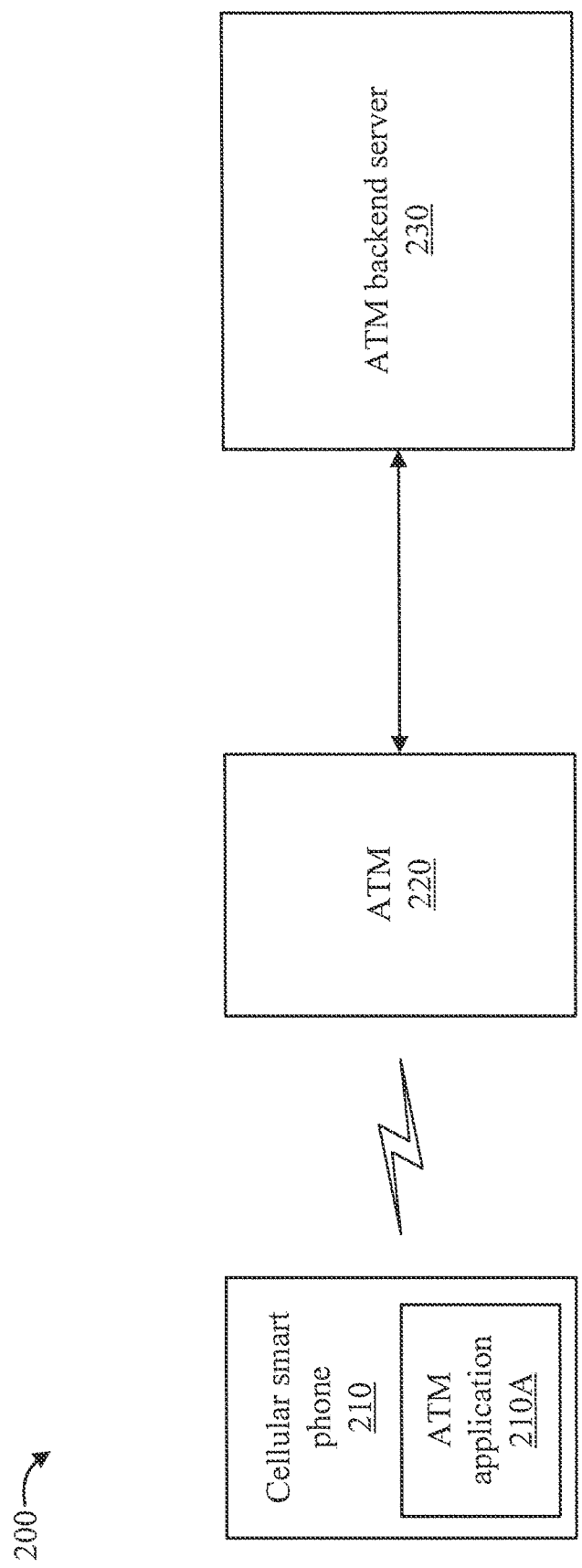
FIG. 2 shows an exemplary system, in accordance with an embodiment of the present invention.

FIG. 2 shows an exemplary system 200, in accordance with an embodiment of the present invention.

The system 200 involves a smart cellular phone 210 configured to function as a mobile debit card, and having an Automated Teller Machine (ATM) application 210A for interfacing with ATMs.

The ATM application 210A is supplemented with a neural network (NN) based biometric verification 220A process performed by an ATM 220 and configured to reduce an incorrect user error value overtime to increasingly harden the ATM application 210A to undesired intrusion. The NN based biometric verification process comprises: performing an initial face recognition of a given user of the ATM session; greeting the given user with one of a plurality of questions in a specific language and evaluating a pre-defined answer provided from the given user in the specific language; and detecting, in an acoustic utterance having dialogue in support of an ATM session, a voice and a prosody style indicative of the given user in combination with lip and face movements made by the given user corresponding to and in synchronization with the acoustic utterance. The ATM session is terminated responsive to an unsuccessful face recognition, an incorrect pre-defined answer, and any of non-matching prosody style and lip and face movements.

The ATM 220 has a backend server 220B that can be located remote from the ATM, e.g., in the cloud, for providing the ATM and inventive services.

The ATM 220 can communicate with the cellular phone 210 using any wireless communication protocol including BLUETOOTH, cellular, WIFI, personal area network (PAN), and so forth. The ATM 220 can communication with the backend server using any wired and/or wireless communication protocol.

Figure 3:
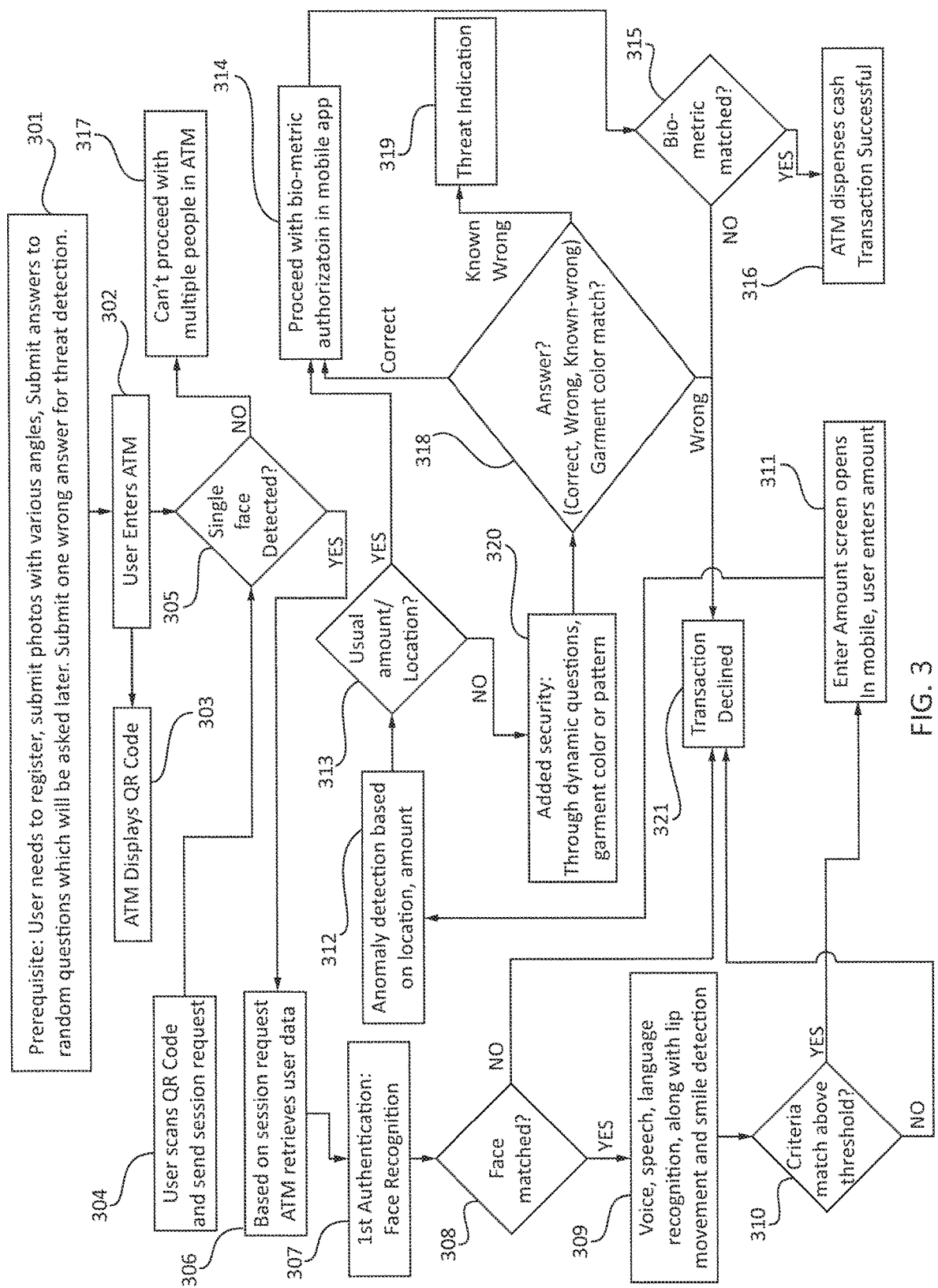
FIG. 3 shows an exemplary method for secure and contactless debit transactions, in accordance with an embodiment of the present invention.

FIG. 3 shows an exemplary method 300 for secure and contactless debit transactions, in accordance with an embodiment of the present invention.

At block 301, user needs to preregister, submit photos with various angles, submit answers to random questions which will be asked later. Submit one wrong answer for threat detection.

At block 302, the user enters/approaches the ATM.

At block 303, the ATMs displays a QR code.

At block 304, the user scans the QR code and sends a session request.

At block 305, it is determined if a single face is detected. If so, then proceed to block 306. Otherwise, proceed to block 317.

At block 306, based on session request, the ATM retrieves user data.

At block 307, a first authentication involving face detection is performed.

At block 308, it is determined is the face matched a previous registered face. If so, then proceed to block 309. Otherwise, proceed to block 321.

At block 309, perform voice, speech, and language recognition along with lip movement and smile detection.

At block 310, it is determined if a criteria match above a threshold amount occurred for block 309. If so, then proceed to block 311. Otherwise, proceed to block 321.

At block 311, enter amount screen opens in the mobile application, and user enters the amount.

At block 312, perform anomaly detection based on location amount.

At block 313, determine if the amount and the location are usual. If so, then proceed to block 314. Otherwise, proceed to block 320.

At block 314, proceed with biometric authorization in the mobile application.

At block 315, determine if the biometrics matched. If so, then proceed to block 316. Otherwise, proceed to block 321.

At block 316, the ATM dispenses cash and the transaction is successful.

At block 317, the ATM cannot proceed with multiple people in an ATM area.

At block 318, determine if the answer is correct, wrong, or known wrong. If correct, then proceed to block 314. If wrong, then proceed to block 321. If known wrong, then proceed to block 319.

At block 319, provide a threat indication.

At block 320, perform added security steps through dynamic questions, garment color and pattern.

At block 321, the transaction is declined.

Figure 4:
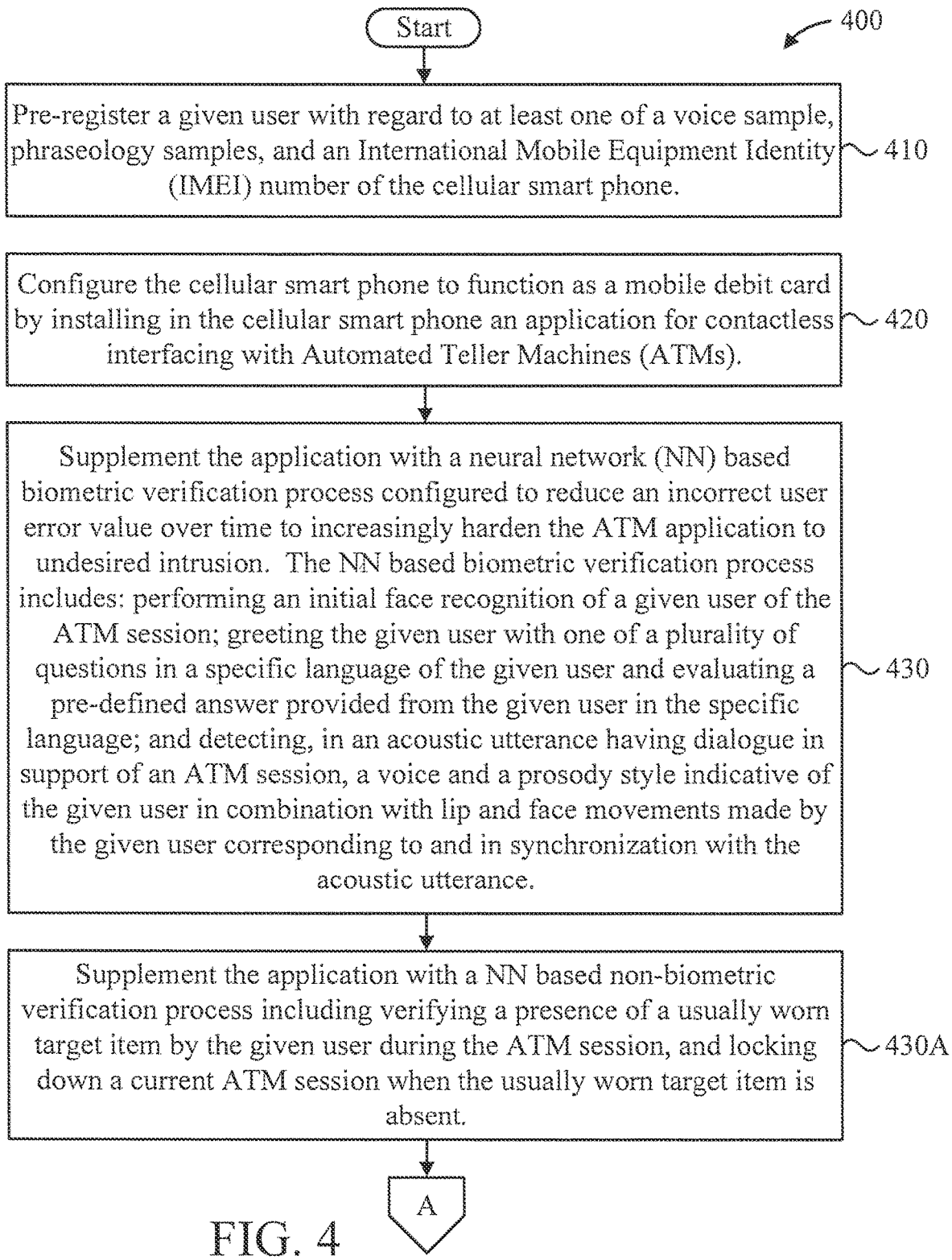
FIGS. 4-6 show another exemplary method for secure and contactless debit transactions, in accordance with an embodiment of the present invention.
Figure 5:
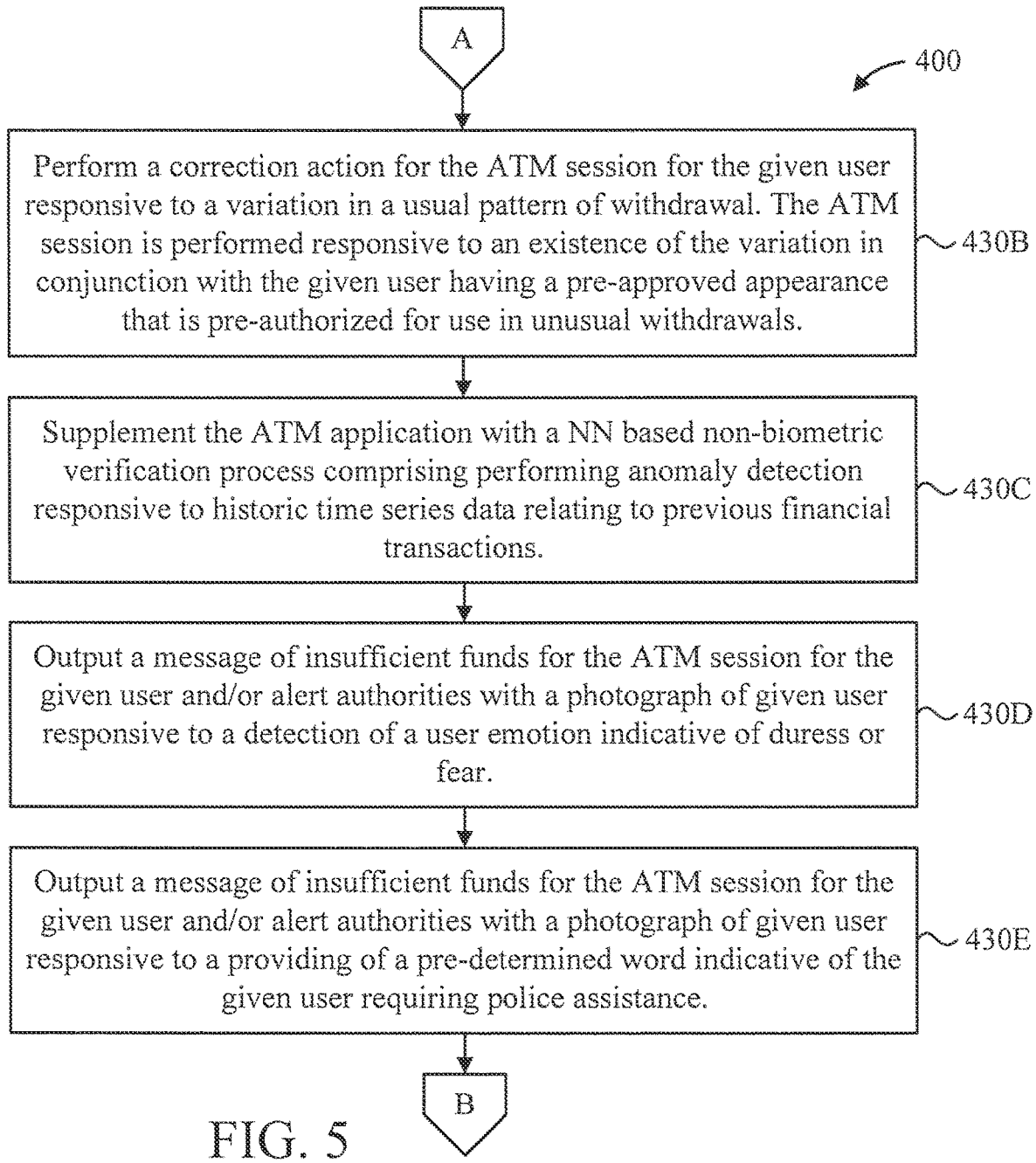
Figure 6:
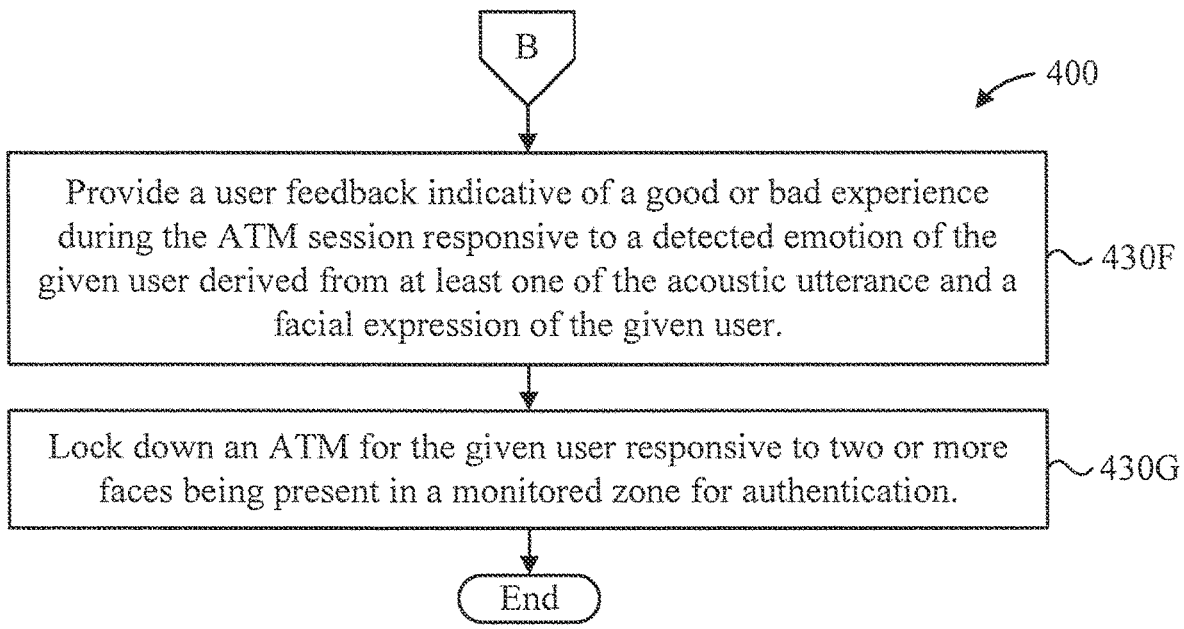

FIGS. 4-6 show another exemplary method 400 for secure and contactless debit transactions, in accordance with an embodiment of the present invention. Method 400 is a variation of method 300 and can include more or less blocks than described, depending upon the implementation. The description of method 400 is more detailed than method 300 to further show various aspects of the present invention.

At block 410, pre-register a given user with regard to at least one of a voice sample, phraseology samples, and an International Mobile Equipment Identity (IMEI) number of the cellular smart phone.

At block 420, configure the cellular smart phone to function as a mobile debit card by installing in the cellular smart phone an application for contactless interfacing with Automated Teller Machines (ATMs).

At block 430, supplement the application with a neural network (NN) based biometric verification process configured to reduce an incorrect user error value over time to increasingly harden the application to undesired intrusion. The NN based biometric verification process includes: performing an initial face recognition of a given user of the ATM session; greeting the given user with one of a plurality of questions in a specific language of the given user and evaluating a pre-defined answer provided from the given user in the specific language; and detecting, in an acoustic utterance having dialogue in support of an ATM session, a voice and a prosody style indicative of the given user in combination with lip and face movements made by the given user corresponding to and in synchronization with the acoustic utterance. The ATM session is locked down responsive to an unsuccessful face recognition, an incorrect pre-defined answer, and any of non-matching prosody style and lip and face movements.

In an embodiment, block 430 can include one or more of blocks 430A through 430G.

At block 430A, supplement the application with a NN based non-biometric verification process including verifying a presence of a usually worn target item by the given user during the ATM session, and locking down a current ATM session when the usually worn target item is absent. The target items can be, for example, one or more of a clothes article of a certain color, a clothes article of a certain style (e.g., overcoat, sweater, undershirt, etc.), a piece of jewelry, a hat, a scarf, a tie, a clip, and so forth.

At block 430B, perform a corrective action (e.g., lock down the ATM for the ATM session for the given user and/or alert authorities with a photograph of the given user and/or so forth) responsive to a variation in a usual pattern of withdrawal. The usual pattern of withdrawal can relate to at least one of a usual withdrawal location, a usual withdrawal time, a usual withdrawal frequency, and a usual withdrawal amount. The ATM session is performed (and the lockdown is avoided) responsive to an existence of the variation in conjunction with the given user having a preapproved appearance, that is, wearing a target item that is preauthorized for use in unusual withdrawals, e.g., relating to at least one of the usual withdrawal location, the usual withdrawal time, the usual withdrawal frequency, and the usual withdrawal amount.

At block 430C, supplement the application with a NN based non-biometric verification process comprising performing anomaly detection responsive to historic time series data relating to previous financial transactions.

At block 430D, output a message of insufficient funds for the ATM session for the given user and/or alert authorities with a photograph of given user responsive to a detection of a user emotion indicative of duress or fear. The detection can be based on detecting a frown, sweat, constantly looking around, mouthing the word "help", and so forth.

At block 430E, output a message of insufficient funds for the ATM session for the given user and/or alert authorities with a photograph of given user responsive to a providing of a predetermined word indicative of the given user requiring police assistance.

At block 430F, provide a user feedback indicative of a good or bad experience during the ATM session responsive to a detected emotion of the given user derived from at least one of the acoustic utterance and a facial expression of the given user.

At block 430G, lock down an ATM for the given user responsive to two or more faces being present in a monitored zone for authentication The two or more faces can be detected based on camera images, heat signatures, and so forth in a monitored zone, for example, directly in front of a person detection device (camera, microphone etc.) of the phone. In an embodiment, the monitored zone can be acoustically monitored for 2 or more voices indicative of two or more faces being present in the monitored zone.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed. Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method, comprising:
   configuring a cellular smart phone to function as a mobile debit card by installing in the cellular smart phone an application for contactless interfacing with Automated Teller Machines (ATMs);
   supplementing the application with a neural network (NN) based biometric verification process configured in a backend server that utilizes data received from input peripherals on an Automated Teller Machine (ATM) to reduce an incorrect user error value over time to the application against undesired intrusion, wherein the NN based biometric verification process comprises:
      performing an initial face recognition of a given user of an ATM session;
      greeting the given user with one of a plurality of questions in a specific language of the given user and evaluating a pre-defined answer provided from the given user in the specific language;
      detecting, in an acoustic utterance having dialogue in support of the ATM session, a voice and a prosody style indicative of the given user in combination with lip and face movements made by the given user corresponding to and in synchronization with the acoustic utterance; and
      detecting pre-approved appearance characteristics including apparel from one or more images that are pre-authorized by the user;
   wherein the ATM session is locked down responsive to an unsuccessful face recognition, an incorrect pre-defined answer, and any of non-matching prosody style and lip and face movements; and
   optimizing the NN based biometric verification process by continuous learning through active user feedback to improve accuracy of the NN.

2. The method of claim 1, further comprising performing a corrective action for the ATM session for the given user responsive to a variation in a usual pattern of withdrawal.

3. The method of claim 2, wherein the corrective action is selected from the group consisting of locking down the ATM and alerting authorities with a photograph of the given user.

4. The method of claim 2, wherein the ATM session is continued responsive to an existence of the variation in conjunction with the given user having the pre-approved appearance characteristics that are pre-authorized for use in unusual withdrawals.

5. The method of claim 1, wherein the application further comprises a NN based non-biometric verification process comprising performing anomaly detection responsive to historic time series data relating to previous financial transactions.

6. The method of claim 1, further comprising performing a corrective action for the ATM session for the given user responsive to a detection of an item selected from the group consisting of a user emotion indicative of duress or fear and a predetermined word indicative of the given user requiring police assistance.

7. The method of claim 1, further comprising providing a user feedback indicative of a good or bad experience during the ATM session through the application responsive to a detected emotion of the given user derived from at least one of the acoustic utterance and a facial expression of the given user.

8. The method of claim 1, wherein the initial face recognition is configured to lock down an ATM for the given user responsive to two or more faces being present in a monitored zone for authentication.

9. The method of claim 1, further comprising pre-registering the given user in-person at a bank with regard to at least one of a voice sample, phraseology samples, and an International Mobile Equipment Identity (IMEI) number of the cellular smart phone.

10. The method of claim 1, wherein the NN based biometric verification process further comprises a non-biometric verification process comprising verifying a presence of a target item of the given user from one or more images during the ATM session, and locking down the ATM session when the target item is absent.

11. A contactless Automated Teller Machine (ATM) system, comprising:
a cellular smart phone configured to function as a mobile debit card having an application for contactless interfacing with Automated Teller Machines (ATMs);
wherein the application is supplemented with a neural network (NN) based biometric verification process configured in a backend server that utilizes data received from input peripherals on an Automated Teller Machine (ATM) to reduce an incorrect user error value over time to secure the application against undesired intrusion, wherein the NN based biometric verification process comprises a neural network (NN) based biometric verification process, supplementing the application, and to reduce an incorrect user error value over time to secure the application against undesired intrusion, wherein the NN based biometric verification process comprises:
performing an initial face recognition of a given user of an ATM session;
greeting the given user with one of a plurality of questions in a specific language of the given user and evaluating a pre-defined answer provided from the given user in the specific language;
detecting, in an acoustic utterance having dialogue in support of the ATM session, a voice and a prosody style indicative of the given user in combination with lip and face movements made by the given user corresponding to and in synchronization with the acoustic utterance; and
detecting pre-approved appearance characteristics including apparel from one or more images that are pre-authorized by the user;
wherein the ATM session is locked down responsive to an unsuccessful face recognition, an incorrect pre-defined answer, and any of non-matching prosody style and lip and face movements; and
optimizing the NN based biometric verification process by continuous learning through active user feedback to improve accuracy of the NN.

12. The contactless Automated Teller Machine (ATM) system of claim 11, wherein a corrective action is performed for the ATM session for the given user responsive to a variation in a usual pattern of withdrawal.

13. The contactless Automated Teller Machine (ATM) system of claim 12, wherein the corrective action is selected from the group consisting of locking down the ATM and alerting authorities with a photograph of the given user.

14. The contactless Automated Teller Machine (ATM) system of claim 12, wherein the ATM session is continued responsive to an existence of the variation in conjunction with the given user having the pre-approved appearance characteristics that are pre-authorized for use in unusual withdrawals.

15. The contactless Automated Teller Machine (ATM) system of claim 11, wherein the application further comprises a NN based non-biometric verification process comprising performing anomaly detection responsive to historic time series data relating to previous financial transactions.

16. The contactless Automated Teller Machine (ATM) system of claim 11, wherein the application performs a corrective action for the ATM session for the given user responsive to a detection of an item selected from the group consisting of a user emotion indicative of duress or fear and a predetermined word indicative of the given user requiring police assistance.

17. The contactless Automated Teller Machine (ATM) system of claim 11, wherein the NN based biometric verification process further comprises providing a user feedback indicative of a good or bad experience during the ATM session through the application responsive to a detected emotion of the given user derived from at least one of the acoustic utterance and a facial expression of the given user.

18. The contactless Automated Teller Machine (ATM) system of claim 11, wherein the initial face recognition is configured to lock down an ATM for the given user responsive to two or more faces being present in a monitored zone for authentication.

19. The contactless Automated Teller Machine (ATM) system of claim 11, wherein the given user pre-registers in-person at a bank with regard to at least one of a voice sample, phraseology samples, and an International Mobile Equipment Identity (IMEI) number of the cellular smart phone.

20. The contactless Automated Teller Machine (ATM) system of claim 11, wherein the ATM application further comprises a NN based non-biometric verification process comprising verifying a presence of a target item of the given user from one or more images during the ATM session, and locking down the ATM session when the target item is absent.

* * * * *